2,967,761
PROCESS OF PREPARING DIBORANE

Hugh J. Bronaugh, Dover, N.J., assignor, by mesne assignments, to Thiokol Chemical Corporation, a corporation of Delaware No Drawing. Filed Dec. 23, 1955, Ser. No. 554,932

7 Claims. (Cl. 23—204)

This invention relates to improvements in methods of preparing diborane from borohydrides and more particularly relates to improvements in the preparation of diborane from borohydrides and dialkyl sulfates.

Known methods are available for preparing diborane from alkali metal and other borohydrides but improved methods are desirable, particularly affording safer methods, increased yields and lower costs of production. The principal object of this invention is to provide a method of preparing diborane of high purity and in high yield at substantial savings in cost compared with known methods. Another object is to provide a good method for preparing diborane safely without the use of gaseous reactants such as the boron trichloride and boron trifluoride known to the prior art.

A further object of this invention is to provide a method in which diborane is produced in more concentrated and more readily condensable form in improved yields and at lower cost of separation from diluent gases.

Other objects of this invention will appear as the description proceeds.

In copending application, Serial No. 490,690, filed February 24, 1955, now abandoned, and in its continuation-in-part Serial No. 554,931, filed December 23, 1955, a novel method of preparing diborane is described in which a borohydride, particularly an alkali metal borohydride, reacts with a dialkyl sulfate, particularly dimethyl sulfate, to form diborane of high purity in high yields. Other products formed in the reaction are largely sodium methyl sulfate and methane when the alkali metal borohydride is sodium borohydride and where the dialkyl sulfate used is dimethyl sulfate. Minor amounts of hydrogen may also be formed. The reaction disclosed in the co-pending applications appears to proceed according to the following equation using sodium borohydride and dimethyl sulfate:

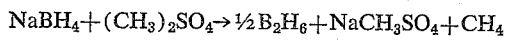

Generally, equimolar proportions of the borohydride and alkyl sulfate are mixed in a suitable ether reaction medium. The evolved gases comprise largely alkane (e.g., methane) and diborane in the molar proportions of 2:1 respectively. The reaction is preferably carried out in a reaction medium comprising a suitable ether, particularly diethylene glycol dimethyl ether. The reaction proceeds at temperatures above −30° C. More particularly, the prior examples disclose carrying out the reaction at between 25 and 40° C. According to the disclosures of the co-pending applications, the diborane product is separated from the by-product methane by partial condensation. Such separation requires expensive low-temperature refrigeration and there is always significant loss of the less volatile component of the mixture in the stream of uncondensed gas.

It has now been surprisingly found that the diborane can be advantageously obtained in substantially undiluted form by conducting the reaction in two separate and distinct stages. The first stage is characterized by the addition of a molar proportion of dialkyl sulfate to the borohydride not exceeding one-half of that stoichiometrically required by the above equation and as described in the prior applications noted above. Suitably the molar proportion of dialkyl sulfate can vary from about one-fourth to one-half of the required stoichiometric amount. The first stage reaction is conducted at temperatures of about −30° C. to 40° C. and preferably at about 25° to 40° C. Only alkane and trace amounts of by-product hydrogen are evolved up to the point at which about half of the stoichiometric amount of dialkyl sulfate has been added. No substantial proportions of diborane are evolved with the alkane.

In conducting the first stage reaction, it is advantageous to remove the alkane as completely as possible from the system in order to avoid dilution of the subsequently evolved diborane. This is suitably accomplished by reducing the pressure on the system and removing alkane before proceeding to the second stage of the reaction.

Although substantially no diborane is evolved during the first stage reaction, about one mole of alkane is evolved and one mole of alkyl metal sulfate is formed per mole of dialkyl sulfate used. The alkane containing minor amounts of hydrogen, if moisture or other hydrogen-generating impurities are present in the starting materials or reaction medium, can be separated and discarded or used as heat-producing gas without loss of any substantial proportions of diborane.

If desired, before proceeding to the second stage of the process of the present invention, the by-product alkyl metal sulfate can be removed from the liquid reaction mixture. The mixture is suitably centrifuged, filtered or otherwise separated and the solution is then treated as described below in the second stage.

In the second stage of the process according to the present invention, the liquid reaction mixture is heated to temperatures of about 40° to 150° C., preferably finally to about 100 to 110° C. In this stage, the evolved gases comprise substantially pure diborane and the product is easily condensed and recovered. There is no problem of condensing the diborane from a dilute gas mixture with alkane as in the prior dialkyl sulfate process.

The preferred reaction medium for use in the process of the present invention is diethylene glycol dimethyl ether. However, other polyethylene glycol dialkyl ethers can be used. These ethers have the formula:

where $n$ is 2, 3, 4 and R and R′ represents methyl or ethyl. Dialkyl ethers, for example, diethyl ether and di-n-butyl ether, are also suitable reaction media, particularly when lithium borohydride is the reactant. Tetrahydrofuran is also useful. Of all these ethers, however, diethylene glycol dimethyl ether is the preferred reaction medium since the alkali metal borohydrides are more readily soluble therein.

Best yields of diborane are obtained with solvents which are free from water and any other impurities containing active hydrogen. Distillation of diethylene glycol dimethyl ether from effective dehydrating agents, for example, sodium hydride, gives a purified solvent particularly satisfactory for use in the process of the present invention.

In conducting the second stage of the process of the present invention, the temperature of the reaction mixture can be raised to a temperature at which the ether reaction medium refluxes. This temperature varies according to the nature of the ether employed and in the case of the preferred diethylene glycol dimethyl ether the temperature may be raised to a maximum at atmospheric pressure of about 162° C.

Dimethyl sulfate is the preferred reactant with the borohydride in the process of the present invention.

However, the adjacent higher homologs can be used. For example, diethyl sulfate, di-n-propyl sulfate and di-isopropyl sulfate are suitable.

Borohydrides other than sodium borohydride can be used including potassium and other alkali metal borohydrides, quaternary ammonium borohydrides, for example tetramethyl ammonium borohydride and the like. Of these, sodium borohydride is preferred as the cheapest and most readily available borohydride.

In a once-through operation of the process of the present invention, substantially all of the dialkyl sulfate reacts but only about one-quarter to one-half of the borohydride is utilized. The residual solution, therefore, after completion of the second stage, is preferably fortified by the addition of more borohydride and again treated with dialkyl sulfate as described. Eventually all of the borohydride charged is utilized and the ultimate equation for the process of the present invention is the same as that given above. However, the mode of operation and the results are surprisingly and advantageously distinguished therefrom.

Some of the advantages of the novel method of this invention over prior methods of preparing diborane follow: (1) The reaction is readily controlled and the method can be employed successfully using temperatures from about —30° C. to about +40° C. in the first stage and temperatures from about 40° C. to 150° C. in the second stage. (2) Pressures can range from about 0.025 atm. to about 1 atm. or more. The reaction is, however, conveniently carried out at atmospheric pressure. (3) High yields of substantially pure diborane are readily obtainable. (4) The use of gaseous reactants such as the boron trichloride and boron trifluoride of the prior art is avoided. The handling of the liquid dialkyl sulfates is particularly convenient, especially in operations on a larger than laboratory scale. (5) The dialkyl sulfates, particularly dimethyl sulfate and diethyl sulfate, are commercially available at a fraction of the present cost of the previously used boron trihalides.

No explanation can presently be offered for the surprising behavior of the reaction mixture. In spite of the formation in the first stage of substantially one mole of alkyl metal sulfate and one mole of alkane per mole of dialkyl sulfate used, no diborane is evolved until the reaction mixture is heated in the second stage when the diborane is obtained substantially free from alkane. However, an explanation or understanding of the reaction is not necessary to performing the process.

In the following examples the term "moles" signifies gram moles.

Example I

A two-necked flask fitted with a Dry-Ice cold finger condenser, thermometer, magnetic stirrer and dropping funnel was connected to a series of traps cooled to —196° C. with liquid nitrogen. The flask was charged with 169 grams of a solution containing 179 millimoles of sodium borohydride in diethylene glycol dimethyl ether which had previously been distilled from sodium hydride. The reaction flask was flushed with nitrogen, evacuated to 15 millimeters (Hg) of nitrogen pressure and 60 millimoles (about ⅓ of the stoichiometric requirement) of dimethyl sulfate was added dropwise from the addition funnel. The temperature was about room temperature. After the addition was complete the non-condensable gases (methane and nitrogen) containing no significant amounts of diborane were removed. The reaction flask was then filled with dry nitrogen to an absolute pressure of 120 mm. of mercury and the temperature was increased until refluxing commenced at about 108° C. The refluxing was allowed to continue for one hour after which the reaction vessel was cooled and evacuated through the condensation train. A total of 20.4 millimoles of diborane was isolated which represents a yield of 68 percent based on the amount of dimethyl sulfate added.

Example II

In order to remove hydrogen-generating impurities, 169 gm. of a solution of 179 millimoles of sodium borohydride in diethylene glycol dimethyl ether was treated in the apparatus described in the preceding example with 26 millimoles of diborane. The mixture was refluxed at 108° C. at 120 millimeters of mercury pressure. Hydrogen and excess diborane were evolved and discarded. To the residual solution still containing 179 millimoles of sodium borohydride was added 60 millimoles (33.5 percent of the theoretical requirement) of dimethyl sulfate at room temperature (first stage). The temperature of the solution was then raised to 108° C. (second stage), the absolute pressure being 120 mm. of mercury. Diborane recovered amounted to 20.4 millimoles or 68 percent of theory based on the methyl sulfate added.

I claim:

1. In the preparation of diborane by reacting a lower dialkyl sulfate and an alkali metal borohydride the steps of reacting from 0.25 to 0.5 mole of the lower dialkyl sulfate per one mole of alkali metal borohydride while in admixture with an organic liquid of the class $$RO-(CH_2-CH_2O)_n-R$$

wherein $n$ is an integer from 2 to 4 and R is selected from the group consisting of methyl and ethyl radicals, at a temperature from —30° C. to +40° C. whereby a gas essentially comprising a lower alkane substantially free from diborane is evolved, removing such gas from the zone of reaction and heating the reaction mixture to a temperature of 100° C. to 150° C. whereby diborane substantially free from alkane is separately evolved and recovered.

2. The method of claim 1 wherein the alkali metal borohydride is sodium borohydride.

3. The method of claim 1 wherein the lower dialkyl sulfate is dimethyl sulfate.

4. The method of claim 1 wherein the lower dialkyl sulfate is diethyl sulfate.

5. The method of claim 1 wherein the alkali metal borohydride is sodium borohydride and wherein the dialkyl sulfate is dimethyl sulfate.

6. The method of claim 1 wherein the alkali metal borohydride is sodium borohydride and wherein the dialkyl sulfate is diethyl sulfate.

7. The method of claim 1 wherein the organic liquid is diethylene glycol dimethyl ether.

References Cited in the file of this patent

UNITED STATES PATENTS 2,543,511  Schlesinger 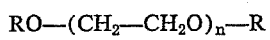 Feb. 27, 1951

OTHER REFERENCES

Metal Hydrides, Inc., Bulletin 502A on NaBH$_4$, 2 pages, received in Patent Office February 15, 1950.

Schlesinger et al.: J.A.C.S., vol. 75, page 187, January 5, 1953.

Audrieth et al.: "Non-aqueous Solvents" (1953), pages 16–20, John Wiley & Sons, Inc., New York.